United States Patent
Chipping (10) Patent No.: US 7,957,524 B2
(45) Date of Patent: Jun. 7, 2011

(54) PROTECTIVE COVERING FOR AN ELECTRONIC DEVICE

(75) Inventor: Phillip Chipping, Salt Lake City, UT (US)

(73) Assignee: Zagg Incorporated, Salt Lake City, UT (US)

( * ) Notice: Subject to any disclaimer, the term of this patent is extended or adjusted under 35 U.S.C. 154(b) by 645 days.

(21) Appl. No.: 11/681,665

(22) Filed: Mar. 2, 2007

(65) Prior Publication Data

US 2009/0086415 A1    Apr. 2, 2009

Related U.S. Application Data

(60) Provisional application No. 60/778,339, filed on Mar. 2, 2006.

(51) Int. Cl.
*H04M 1/02* (2006.01)

(52) U.S. Cl. ............... 379/428.01; 379/437; 455/575.1; 206/320

(58) Field of Classification Search ............. 206/320, 206/497, 811; 150/161, 162, 165, 154; 379/428.01, 379/437; 455/575.01
See application file for complete search history.

(56) References Cited

U.S. PATENT DOCUMENTS

| | | |
|---|---|---|
| 5,132,588 A | 7/1992 | Warman |
| RE35,318 E | 8/1996 | Warman |
| 5,677,050 A | 10/1997 | Bilkadi et al. |
| 5,730,644 A | 3/1998 | Pfanstiehl |
| 5,820,957 A | 10/1998 | Schroeder et al. |
| 6,082,535 A | 7/2000 | Mitchell |
| 6,142,868 A | 11/2000 | Pfanstiehl |
| 6,250,765 B1 | 6/2001 | Murakami |
| 6,372,313 B1 | 4/2002 | D'Alessio et al. |
| 6,408,132 B1 * | 6/2002 | Ishikawa .................. 396/2 |
| 6,613,411 B2 | 9/2003 | Kollaja et al. |
| 6,614,423 B1 | 9/2003 | Wong et al. |
| 6,802,416 B1 | 10/2004 | D'Alessio et al. |
| 6,831,714 B2 | 12/2004 | Masaki et al. |
| 6,841,190 B2 | 1/2005 | Liu et al. |
| 6,878,425 B1 | 4/2005 | Gomes |
| 6,960,040 B2 | 11/2005 | D'Alessio et al. |
| 6,975,888 B2 * | 12/2005 | Buesseler et al. ........ 455/575.1 |
| 7,389,869 B2 | 6/2008 | Mason, Jr. |
| 7,529,364 B2 * | 5/2009 | Buehler .................... 379/451 |
| 7,558,594 B2 * | 7/2009 | Wilson .................... 455/550.1 |
| 7,781,610 B2 | 8/2010 | Mason |

(Continued)

FOREIGN PATENT DOCUMENTS

DE    201 01 039 U1 *  6/2001

(Continued)

OTHER PUBLICATIONS

Tocken Wrapper, Protective film for ipod shuffle; www.tocken.co.kr; 2004-2005.

(Continued)

*Primary Examiner* — David T Fidei
(74) *Attorney, Agent, or Firm* — Workman Nydegger (57) ABSTRACT

A protective cover for electronic devices. A device is examined and a film is prepared. The film may include multiple pieces and may have cutouts for discontinuities in the surfaces of the device or to accommodate a user interface. The corners or other portions of the films are then cut such that the films substantially cover the surface of the device without bunching or creating air pockets.

37 Claims, 7 Drawing Sheets

U.S. PATENT DOCUMENTS

| | | | |
|---|---|---|---|
| 2004/0246386 A1* | 12/2004 | Thomas et al. | 348/818 |
| 2005/0022924 A1* | 2/2005 | Blackburn | 156/230 |
| 2005/0047589 A1* | 3/2005 | Chang | 379/452 |
| 2005/0116334 A1 | 6/2005 | Buehler | |
| 2006/0040081 A1* | 2/2006 | Hodsdon et al. | 428/40.1 |
| 2006/0222801 A1 | 10/2006 | Mase | |
| 2007/0026234 A1* | 2/2007 | Mase | 428/411.1 |
| 2007/0229962 A1 | 10/2007 | Mason | |
| 2009/0301907 A1 | 12/2009 | Mason | |
| 2009/0325657 A1* | 12/2009 | Ramsdell et al. | 455/575.8 |
| 2010/0270189 A1 | 10/2010 | Pedersen et al. | |

FOREIGN PATENT DOCUMENTS

| | | |
|---|---|---|
| EP | 0539099 | 4/1993 |
| KR | 20-0206982 | 12/2000 |
| WO | 2003-036454 | 5/2003 |
| WO | 2007-046637 | 4/2007 |

OTHER PUBLICATIONS

Tocken Wrapper for iPod mini; http://caizer.com/?mid=tech&page=22&document_srl=20234&listStyle=&page=; Feb. 18, 2005.

http://www.enfun.net/technique/review/?step=20&dataSeqNo=42417; Jan. 13, 2005.

Statement of Min-Woo Seo; Mar. 10, 2010.

http://www.appleforum.com; AppleForum; Jul.-Nov. 2005.

WITHIPOD Community for Korean Ipod Users; http://withipod.net/?mid=podmagazine_notice&category=2078464&search_keyword=tocken&search_target=title&document_srl=2078532; Nov. 22, 2004.

Tocken Wrapper, User's Review; www.withipod.net; Mar. 24, 2005.

Tocken Wrapper, User's Review; www.withipod.net; Mar. 21, 2005.

Tocken Wrapper, Magazine Article, MacMadang, p. 48, Published Jul. 1, 2005.

User's review of Noxk PSP protection film from internet website; http://raven.egloos.com/1076693; Jul. 25, 2005.

Sales Bulletin for Tocken Wrapper; http://kmug.co.kr, Sep. 11, 2005.

Crandall/Dahl/Lardner; "An Introduction to the Mechanics of Solids", pp. 273-276; Jan. 25, 1996. See pp. 14-15 of NPL document No. 13 for relevance.

Presentation for Oral Hearing for Invalidation and Scope Confirmation Trial of Registered Patent No. 784501 (Case No. 2008 Dang 3751 and 2009 Dang 1523); Kim & Chang, Mar. 16, 2010.

English Translation of Sep. 18, 2009 Brief for Seung-Kyun Oh (president of Korean distributor for Zagg), Invalidation and Scope Confirmation Trial of Registered Patent No. 784501 (Case No. 2008 Dang 3751 and 2009 Dang 1523).

Oct. 14, 2009 Brief for Seung-Kyun Oh (president of Korean distributor for Zagg), Invalidation and Scope Confirmation Trial of Registered Patent No. 784501 (Case No. 2008 Dang 3751 and 2009 Dang 1523).

Oct. 14, 2009 Brief for SGP, Invalidation and Scope Confirmation Trial of Registered Patent No. 784501 (Case No. 2008 Dang 3751 and 2009 Dang 1523).

Nov. 14, 2009 Brief for Seung-Kyun Oh (president of Korean distributor for Zagg), Invalidation and Scope Confirmation Trial of Registered Patent No. 784501 (Case No. 2008 Dang 3751 and 2009 Dang 1523).

3M Polyurethane Protective Tape Preparation and Application Instructions, 3M Aerospace Department Engineered Adhesives Division, 2001, 2 pages.

http://web.archive.org/web/20050728232723/www.autopaintguard.com/installation.html (accessed Jul. 27, 2010); Auto Pain Guard application instructions, 7 pages.

* cited by examiner

Fig. 8

PROTECTIVE COVERING FOR AN ELECTRONIC DEVICE

CROSS-REFERENCE TO RELATED APPLICATIONS

This application claims the benefit of U.S. Provisional Application Ser. No. 60/778,339 entitled PROTECTIVE COVERING FOR AN ELECTRONIC DEVICE and filed Mar. 2, 2006, which application is incorporated by reference in its entirety.

BACKGROUND OF THE INVENTION

1. The Field of the Invention

The present invention relates to protective coverings. More particularly, embodiments of the invention relate to systems and methods for covering or shielding electronic devices with thin films including plastic films.

2. The Relevant Technology

Advances in many technology areas have resulted in a proliferation of electronic devices. Many of these devices are portable in nature. Cellular telephones, digital music (e.g., MP3) players, personal digital assistants, satellite radios, laptop computers and portable video/picture players, are examples of electronic devices in use today.

Many of these devices have multiple functions. Some cell phones, for example, are also capable of storing and playing digital music. Some digital music players also have the ability to store digital pictures and video. Many devices also provide their users with various programs such as calendaring applications, email applications, and word processing applications. The increasing versatility and functionality of electronic devices has only led to further reliance on these devices.

The size, versatility, and portability of these devices provides significant advantages. At the same time, and because these devices are electronic in nature, there are some inherent weaknesses that are difficult to overcome. For example, many of these devices have screens that can be scratched or damaged. Often, this type of damage can occur during normal use of the device. Few people enjoy looking at a scratched or damaged screen for many reasons. First of all, a scratched screen is not pleasant to view. In addition, the scratch or damage may actually interfere with the ability of a user to see the displayed images or text. In general, a scratched or damaged screen diminishes the use and value of the device to the user. It is also possible for the body or housing of the device to become damaged or otherwise scratched during use and many users want their devices to retain their original look and feel as long as possible.

Because these devices are used frequently, it is likely that they will be dropped, banged against other objects, and receive other types of abuse, whether deliberate or accidental. In fact, most of the abuse that these devices receive is unintentional. Nonetheless, the damage these devices receive over time can diminish their value and reduce their usability. In particular, a scratched screen is unsightly, may interfere with the user's visual experience (pictures and videos may be hard to watch, text may be hard to read, etc.).

When a device is initially purchased, the screen is often covered by a piece of plastic that has a static adherence to the device. This covering is only meant to provide protection during shipping and is supposed to be removed. It is easily removed and typically includes a tab specifically for removal.

There are some existing screen coverings or protective shields in use today. However, the protection afforded by these screens is temporary and the protection provided is limited for several reasons. For example, conventional screen coverings wear out rather quickly and need to be replaced often. This is expected and these types of coverings are often sold in groups. Some of these coverings do not adhere to the screen, but slip into place and are held loosely over the screen.

Conventional screen coverings themselves are subject to scratches and the like as well. One significant drawback of some conventional coverings is that they begin to separate from the device at the corners and become deformed. As the edges begin to fray or become separated from the device, the appearance bothers the user and the cover is usually removed. In addition, conventional screen coverings are unable to protect the entire device and are typically limited to the screen of an electronic device. There is therefore a need to protect electronic devices including screens of electronic devices.

BRIEF SUMMARY OF THE INVENTION

These and other limitations are overcome by embodiments of the invention which relate to systems and methods for protecting devices. More particularly, embodiments of the invention relate to body covers including plastic films that adhere to surfaces of a device for which protection is desired. The film for a device is typically transparent or clear and, once applied, is substantially unnoticeable. Further, the film may adhere naturally to surfaces of a device, or adhere using an adhesive. The adhesive may adhere to the device or may include pressure bonding and/or temperature bonding in some instances. Embodiments of the invention further contemplate a solution that is used during the application process to ensure that the film properly adheres to the device. The solution can be applied to the adhesive on the film and this permits the film to be properly positioned on the device prior to full adhesion of the film to the device. The solution may also make it easier to remove air bubbles from underneath the film.

A body cover is one embodiment of a film that is used to protect more than a screen of a device. A body cover protects other surfaces and/or aspects of the device. A body cover ensures that the original look of the device is protected. Further, the body cover is typically configured to lay flat against the surface of the device including surfaces such as curves, sloping surfaces, edges, discontinuities and the like or combinations thereof In one embodiment, a body cover can include multiple films. For example, a first film may cover a first surface of a device such as the front surface. A second film of the body cover may protect a second surface of the device such as the back and/or the sides. Further, the first or second films may be configured (such as by cutting or with slits/cuts) that enable the film to lay flat against the surface of the device by accounting for surfaces that are not flat (e.g., corners, sloping surfaces, edges including rounded edges, lips, and the like). Also, the first or second film may be designed to allow for ports or other aspects of the device that may be used for other purposes such as communication with another device.

A body cover or a single film may also have cutout areas that ensure that the film does not impede some functionality of the device and that does not reduce the effectiveness of the body cover. For example, a user interface on a device that is capable of movement (e.g., rotation, depression) may correspond to a cut out area. If the movable user interface were covered with a single film along with other surfaces of the device, then use of the user interface may be degraded and may cause the film to separate from the surface or make it difficult to use the user interface. At the same time, a body cover may also include a separate film for the user interface, thereby avoiding these problems while providing protection to the user interface or other aspect of the device and without interfering with operation of the user interface or other aspect of the device.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to protective coverings and more particularly, to thin film or plastic coverings or shields for electronic devices including portable electronic devices. Embodiments of the invention relate to protective coverings for the screens of electronic devices. Other embodiments of the invention provide protection to other surfaces of the various devices that may include the screen or display of the device. Embodiments of the invention therefore relate to device protectors (also referred to herein as covers, shields, body covers or body shields) that may include more than one film in addition to films that protect screens. A body cover may include one or more separate films that are configured to protect the outer surfaces of the device, which may include the screen.

Because the surfaces of the bodies or the housings of electronic devices are not flat, but may have corners, sides, edges, bulges, protrusions, depressions, discontinuities, lips, shelves, etc., embodiments of the invention are configured such that the film does not bunch or wrinkle. This can be achieved by selectively cutting the film or by dividing the body covering into multiple pieces. For example, the film for a battery cover may be separate from other films of a body cover for other surfaces of the device. This ensures that the surface of the battery cover is protected without interfering with the operation of the device.

When the films of a body cover are properly applied to various surfaces of a device, the films are preferably smooth and flat against the various surfaces of the device and are substantially free of air bubbles, which may become trapped between the film and the surface of the device. For example, if a flat and substantially rectangular film is applied to a corner of a device, the film will bunch and not lay flat on the surfaces of the device. In addition to being unsightly, bunching and/or air pockets may adversely cause the film to separate from the device and bother the user. Further, the film is susceptible to peeling away from the device surface wherever bunching occurs. Embodiments of the invention eliminate these problems.

Embodiments of the invention include films that are cut or formed such that the surfaces of the device are substantially covered without bunching and substantially without creating air pockets. The cuts made to the various films included in a body cover for a device are configured to account for curved surfaces in addition to corners, edges, depressions, bulges, and the like or any combination thereof In some embodiments, the film can wrap around edges or corners without bunching or creating air pockets or bubbles. The film may be cut, for example, if a particular edge of a device is not straight or is curved. Such a cut may be used when a portion of the surface can be viewed as a ramp in one embodiment. Alternatively, the film may be separated into multiple pieces that can be applied separately to the device.

Figure 1:
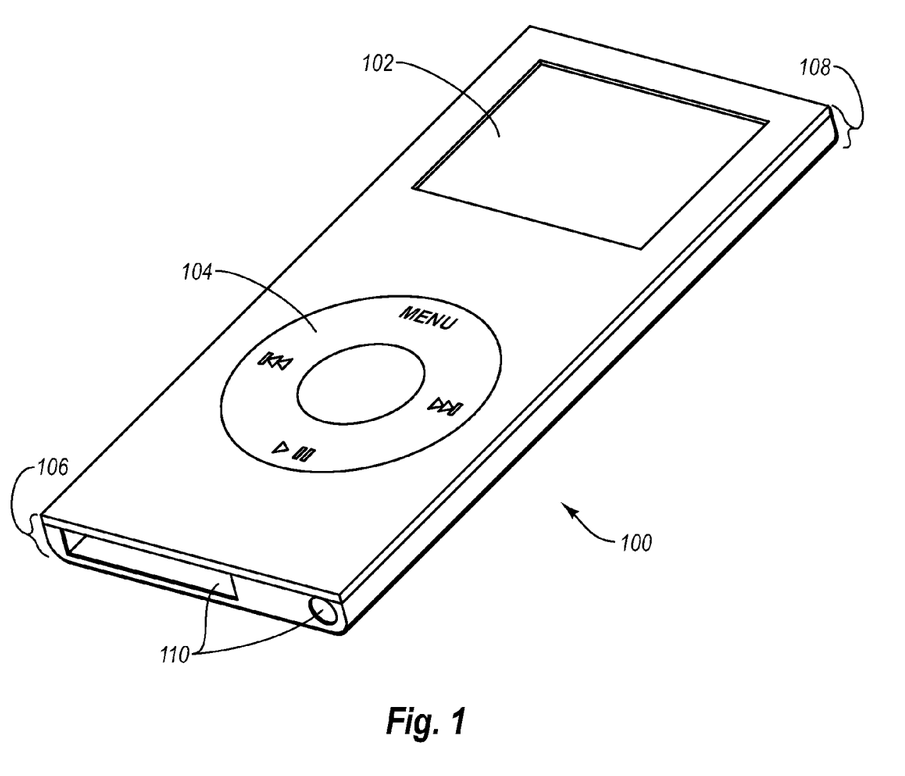
FIG. 1 illustrates an exemplary perspective view of an electronic device that includes a screen and a user interface.

FIG. 1 illustrates an exemplary device and is intended to be representative of other devices. The device 100 represents, by way of example and not limitation, cellular telephones, digital music players, audio recorders, laptop computers, personal digital assistants, satellite radios, watches, GPS devices, bike computers, digital cameras, heart rate monitors, portable DVD players, dive computers, and the like or any combination thereof Embodiments of the invention are further not limited to electrical devices, but can also protect other devices that may or may not have screens or displays.

The device 100 typically includes a screen 102, although some devices may not include a screen. Embodiments of the invention can protect a screenless device as well. In this example, the screen 102 may be flush with a top surface of the device 100 or may be inset with respect to the top surface of the device 100. The relative position of the screen with respect to the corresponding surface may have an impact on how the protective cover is prepared for application on the device 100. In general, embodiments of the invention can be adapted for devices that have surfaces with discontinuities (such as the boundaries between an inset screen and the corresponding surface of the device or between buttons and the corresponding surface of the device). Typically, the discontinuities are accounted for by forming cutout areas in the films of the body cover. This ensures that each film can lay flat against a portion of a surface and also ensures that the functionality of the device corresponding to the cutout area is not impaired. Further, a separate film may be used to protect the area of the device corresponding to the cut out area. The cutout portion may be used to protect the corresponding surface area. In one embodiment, the cutout film may be used on a cut out area.

By using multiple films in a body cover, protection is achieved for each covered surface without interfering with operation of the device. For instance, using a separate film for a user interface that moves ensures that the film moves with the user interface without affecting the film applied to the other surfaces of the device.

The device 100 also includes surfaces or sides 106 and 108 and other sides not shown. The device also has a front side/surface and back side/surface. In this example, the side 106 has ports 110. The ports 110 enable the device 100 to connect to another device. For instance, the device 100 may be rechargeable and connects to an external power supply for recharging through one of the ports 110. Alternatively, the ports 110 or one of the ports may enable the device to exchange data with another device such as a host computer. One of skill in the art can appreciate that the form factors for electronic devices can widely vary. With the benefit of the teachings contained herein, one of skill in the art can prepare and apply a protective cover to any electronic device.

The device 100 also includes a user interface 104. Often, the user interface 104 and the screen 102 work together to enable a user to use the device. In the case of a digital music player, for example, the user interface 104 can be used to select a particular song or playlist and the screen 102 can visually reflect the actions of the user. The device may also display album art or other images on the screen 102 during playback of the selected song or playlist.

Figure 2:
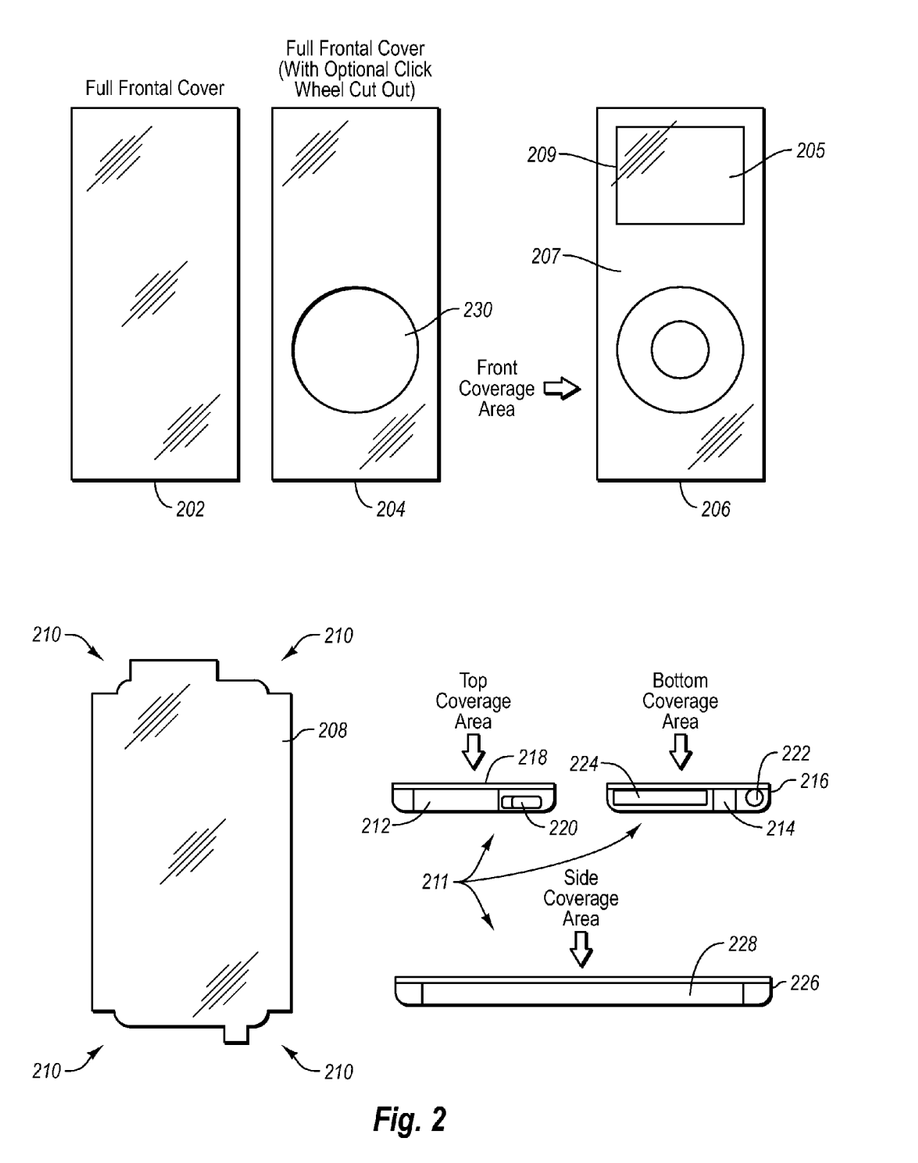
FIG. 2 illustrates exemplary covers that include multiple films that are fixed to an electronic device.

FIG. 2 illustrates one embodiment of a protective cover or of a body cover that includes one or more films for an electronic device such as the device 100 in FIG. 1. The protective cover illustrated in FIG. 2 includes two separate films in this example. As discussed below, however, a body cover may include a single film. FIG. 2 further illustrates different configurations of the films of the protective body cover illustrated in FIG. 2. In one embodiment, the top surface of the device is protected by the film 202 and the bottom surface of the device is protected by the film 208. In another embodiment, the top surface is protected by the film 204 and the bottom surface is covered by the film 208.

One difference between the film 202 and the film 204 is that the film 204 includes a cutout area 230 (or a plurality of cutout areas) that accommodates the user interface of the device. When the film 202 is applied to a device, the user interface is protected by the film 202 and the ability of the user to interact with the device may not be inhibited by the presence of the film 202. The film 204, in contrast, provides a user with the option of protecting the screen of the device as well as some of the top surface area of the device without covering the user interface. If desired, a film matching the cutout area can be applied specifically to the user interface.

The device 206 illustrates the protective cover applied to a device such as illustrated in FIG. 1. Because the screen 205 of the device 206 is flush with the top surface, the film 202 or 204 can be applied without creating an air pocket at the boundary 209. Even in cases where the screen is slightly inset, a single film can still be used to cover the screen and other portions of the surface of the device. An air pocket at the boundary 209 could cause the film 207 to separate from the device 206 at some point. If the screen 205 is inset with respect to the top surface of the device more substantially, then the film 207 may include two separate films. The first film would be configured (such as by cutting) to fit the screen 205 while the second film would adhere to the top surface of the device. The second film would have a cutout area for the screen of the device. This enables the film to lay flat on the device without creating an air pocket at the point where the inset screen and top surface meet. In one embodiment, the cutout area for a device with an inset screen can be configured to curve down and provide additional protection to the walls of the inset area. This can be achieved, for example, by cutting short slits at each corner such that the film can fold flatly against the surface of the device as the surface slopes down to the inset screen. In another embodiment, the film may simply be applied over both the screen and the surface. The strength of the adhesive prevents the film from peeling away.

The film 208 that covers or protects a back side of a device has an outline that is cut or shaped to adapt to various aspects of the device. The corners 210 of the film 208, for example, are formed or cut such that bunching of the film or air pockets are not formed as the film 208 is applied to more than one side or surface of the device including edges and corners. The film is typically flexible such that it can wrap around corners or otherwise adapt to the surface of the device while still being flat against the surface of the device.

The side coverage 211 illustrates how the film 208 covers sides of the device in addition to covering the back surface. The side 218 is covered by the film 212. In other words, the edges of the film 212 are prepared to cover the side of the device. Preparing the edges can include cutting the edges to account for device ports, surface slopes, surface discontinuities, and the like or any combination thereof. Thus, the film 208 wraps around the edge of the device formed by the back side and the side 218. In this example, the film 208 has been formed or cut such that the port 220 remains accessible to a user. Similarly, the ports 222 and 224 on the side 216 remain accessible after the film 208 is applied while covering a portion with the film portion 214. The side 226 illustrates the coverage of the film 208 on the side 226.

In this example, the film 208 has been designed to wrap around certain edges of the device and cover at least a portion of the sides while the film 202 does not wrap around any edges of the device and covers the top surface of the device. One of skill in the art can appreciate that the one or both of the top and bottom films can wrap around edges of the device. Thus, in FIG. 2, the film 202 or 204 is only applied to the top surface of the device and none of the film 202 or 204 folds over to wrap around and edge of the device and cover a portion of the sides of the device.

Figure 3:
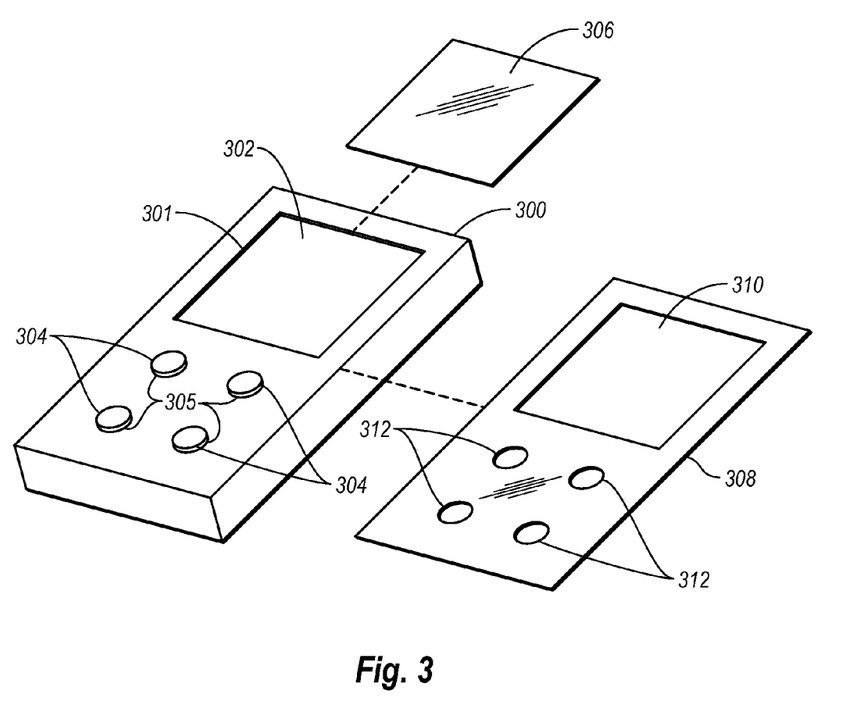
FIG. 3 illustrates exemplary films with cutout areas as well as being configured for discontinuities in the surface of a device.

FIG. 3 illustrates a device 300 having a screen 302 that is slightly inset from the top surface of the device 300. The device 300 also includes a user interface that includes buttons 304. As a result, the top surface has discontinuities at the boundary 301 where the housing meets the screen 302 and at the boundary 305 where the buttons 304 extend out from the surface of the device 300. In this example, the film used to protect the top surface of the device 300 would include at least two pieces. The film 306 is cut to fit the screen 302. When the film 306 is applied to the screen 302, no air pockets are formed and the film 306 lays flat against the screen 302. The film 308 includes a cutout area 310 to account for the inset screen 302 and cutout areas 312 to account for the buttons 304. When the film 308 is applied to the device 300, it also lays flat without creating air bubbles or bunching.

One of the advantages of the cutout areas 310 and 312 is that the films 306 and 308 can rest flat against the top surface of the device 300. Using two films to protect the top surface prevents air bubbles from forming at boundaries or other discontinuities. Also, the cutout areas 312 ensure that the film portion 308 does not interfere with the operation of the device 300. Further, the films are transparent and when applied as described they are not very noticeable.

Figure 4:
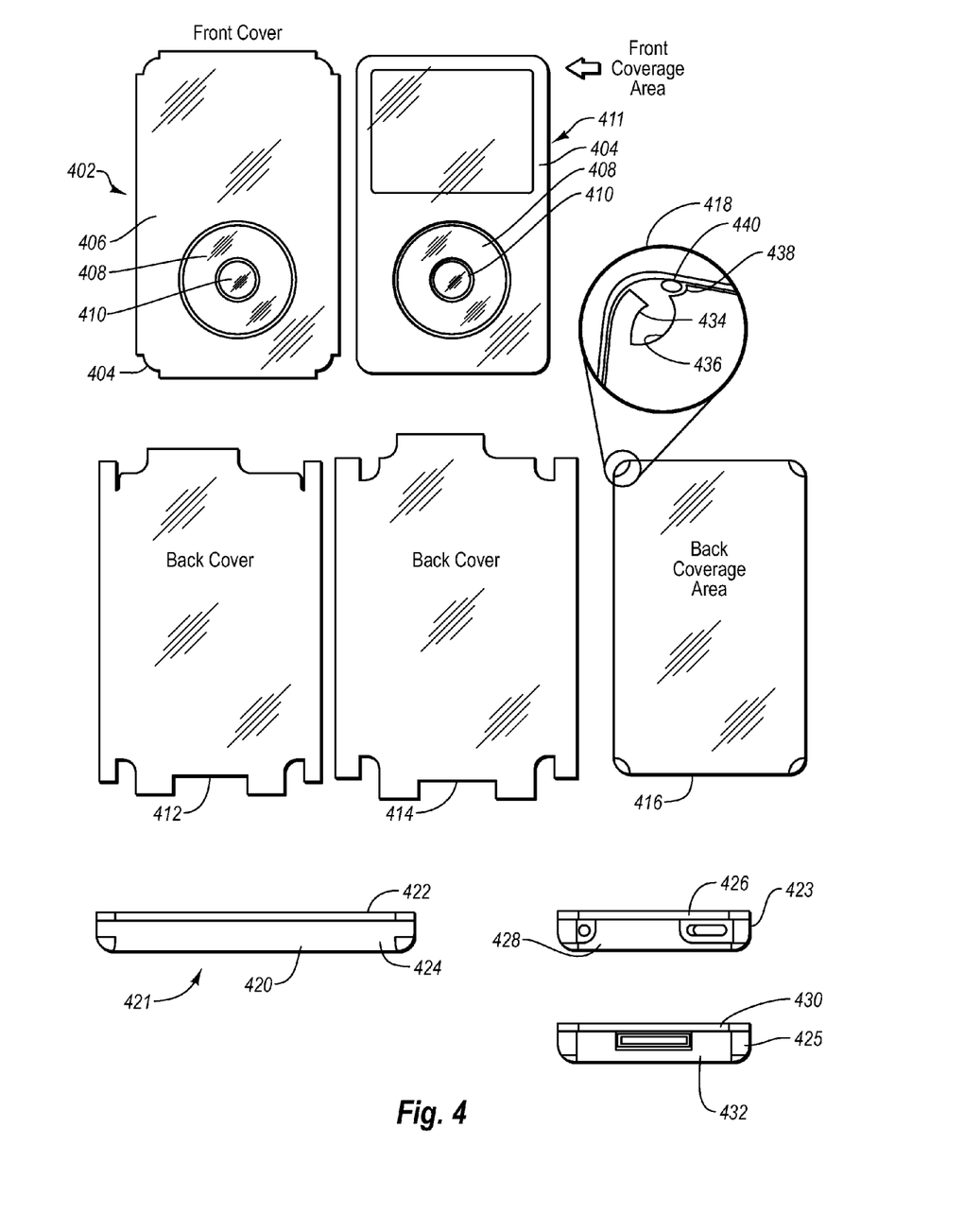
FIG. 4 illustrates another embodiment of films where the corners of the film include cuts to ensure that the films lay flat against the surface of the protected device.

FIG. 4 illustrates another embodiment of a protective film for a device. In this example, the film 402 includes the films 406, 408, and 410. The film 402, when applied to a top surface of a device, is illustrated at 411. The film portion 404 covers the screen and some of the rest of the top surface. The films 408 and 410 cover different parts of the user interface of the device. As previously described, one or both of the films 408 and 410 can be omitted. Further, the films 408 and 410 correspond to cutout areas in one embodiment.

In this example, the film portion 404 also covers some of the sides of the device by wrapping around the edges. The side coverage 421 illustrates the coverage provided by the film 404 (or more generally the film 402) and the film 412 or 414 (the films 412 and 414 are for different models of the same device) to the sides of a device. The portion of the side 420 covered by the film 422 is represented by the film 422. Similarly, the portions of the sides 423 and 425 covered by the film 402 is represented, respectfully, by the film 426 and 430.

The portions of the sides 420, 423, and 425 covered by the film 412 or 414 are represented, respectfully, by the films 424, 428, and 432.

In this example, the corners of the device being protected are rounded and may have sloping surfaces. The blow up 418 illustrates a corner of a device and shows that the film 414 is cut or shaped such that edges and corners of the device can be substantially covered without bunching or forming air pockets. The film 414 includes a tab 434 that can wrap around a corner of the device regardless of the specific shape of the device. The cut 436 enables the film 414 to lay flat on the surface of the device as the film wraps around the corner shown in blow up 418. The cut 438 ensures that the user has access to the port 440.

When a film is designed for a device either as a body cover or for a specific portion of the device such as the screen, the device is first examined to identify locations that may require attention (such as discontinuities, corners, edges, user interfaces, screens, sloping surfaces, rounded edges or corners, etc.). Further, the film can be designed with various options in mind. For example, portions of the device that correspond to cut out areas in a film can be provided with a separate film if desired.

For a body cover for a given device, at least two films may be needed, although a single film may be provided as a body cover for some devices. Typically, one film is prepared for a top or front surface of the device and a second film is prepared for the bottom or back surface of the device. One of the first or second films may also be configured to protect sides of the device. The specific configuration of the films may depend on the shape of the device. For example, often the top film and/or the bottom film will wrap around the sides of the device such that coverage or protection is provided to the sides of the device. Alternatively, separate films could be prepared for the sides. In addition, the corners or edges of the two films are cut or shaped to account for corners, sloping surfaces, etc., and to insure that the films lay flat against these types of surfaces of the device when applied to the device.

Next, cutout areas are identified and appropriate cuts are made in the films. This may include, for example, a cutout area for the user interface. Note that the film that is cut out can optionally be applied separately as a film for the user interface or other aspect of the device. In FIG. 2, for example, the user interface can be covered with a film or not covered with a film. Then, the corners of the films are typically examined. The corners of the films are cut to ensure that the films will lay flat against the device even at the corners as previously described. This may include forming tabs or making other cuts to account for sloping surfaces, three dimensional corners, rounded corners, etc. Also, any ports on the device are considered and the films are cut such that the ports remain accessible to the user.

In another embodiment of the invention, the body covering includes a solution that may be used during application of the body covering to a device. The solution is designed to improve the ease with which the body covering is applied as well as improve the adhesion of the body covering to the device. The solution may be applied to the film prior to application. The solution may provide additional time for the user to properly position the film before the adhesive fully sticks to the device. The solution also enables trapped air bubbles to be removed as the film adheres to the surface of the device. The solution may be, by way of example only, a mixture of soap and water. In effect, the film delays the adhesion of the film to the device and improves customer satisfaction by providing a user with more time to properly position each film of a body cover on a device.

The film or body cover may be, by way of example only, a thermoplastic elastomer or a urethane plastic film, which combines the mechanical and physical properties of rubber with the advantages of thermoplasticity. Other examples of the film may include a polyether urethane, a polyester urethane or an aliphatic urethane.

In one embodiment, the film has properties of rubber and of plastic. With these properties, the film has excellent abrasion resistance. Further, application of the film to a scratched surface may hide the scratches or make the scratches less noticeable.

Embodiments of the film have a memory that enables the film to be elongated and then return to its original shape. The film can be soft and malleable, yet have high tensile strength. Examples of the film can have a hardness that ranges from very soft to stiff, by way of example only from Shore 25A-Shore 75D in a durometer range. Further, the film has good flexibility over a wide durometer range. This hardness or softness of the film to absorb impact (stretch or deform) and then return to an original shape provides additional protection to a protected device. Thus, embodiments of the invention relate to films that have both abrasion resistance and impact resistance. The film may have a thickness that is on the order of 8 mils. In another example, the film may have a thickness that is on the order of 6 mil or on the order of 6- 8 mil or greater. This thickness may not include the thickness of the adhesive that is included with the film. One of skill in the art can appreciate that thinner or thicker films may be used. These properties make the films of the present invention provide excellent protection as a body cover for a device. In some embodiments of the invention, the films may not contain plasticizers and are therefore not subject to brittleness.

Embodiments of the film have elastic properties such that it may stretch or deform when a stress is applied and then return to the original shape when the stress is removed. The film can be applied or bonded to a device surface using an adhesive, by heat bonding, pressure bonding, and the like or any combination thereof.

Figure 5:
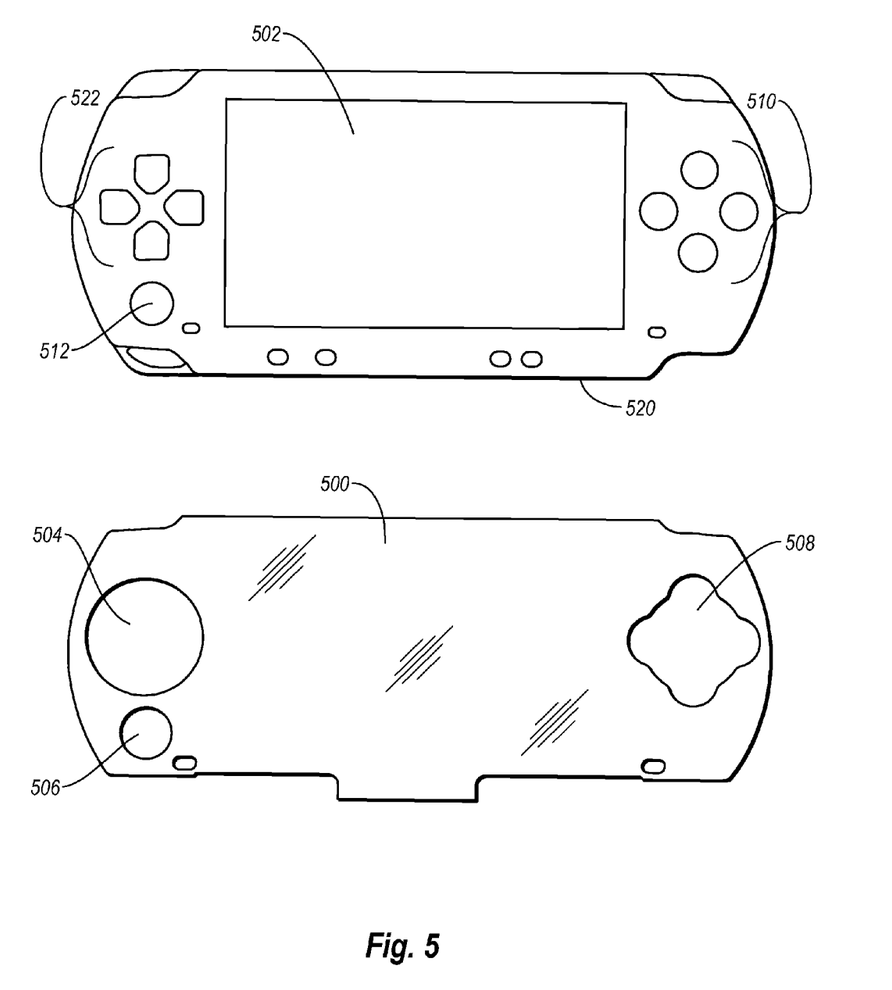
FIG. 5 illustrates another embodiment of a body cover for an electronic device.

FIG. 5 illustrates a body cover for a device 520. The device 520 includes a display 502 and a user interface in the form of buttons 510 and 512. The cutout areas 502, 508 and 508 may be formed in the film 500 to account for the buttons 510 and 512. Thus, the film 500, when applied to the device 520, covers the top surface of the device including the display 502 without interfering with the user interface. The film may account for speaker openings and the like as well.

Figure 6:
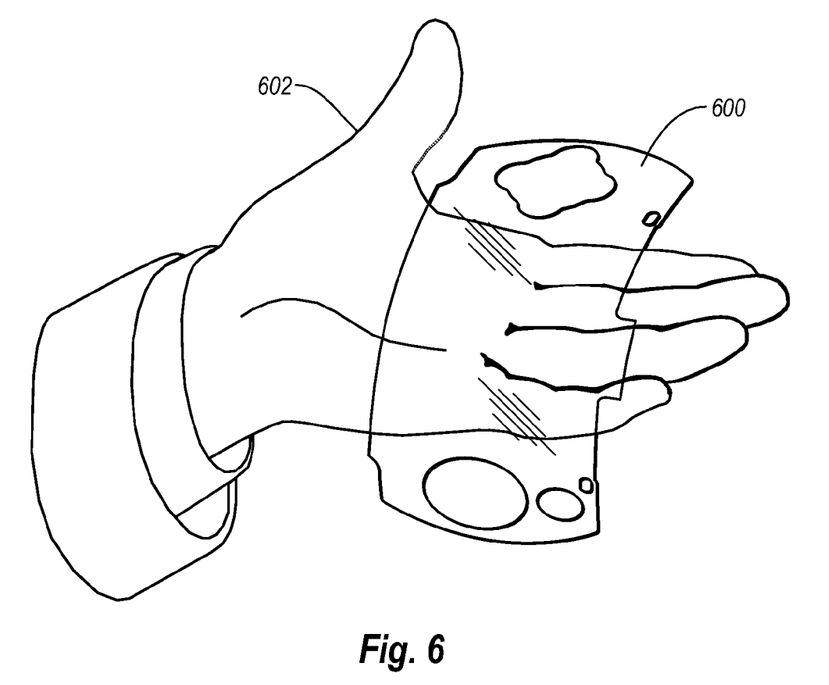
FIG. 6 illustrates aspects of an exemplary film.

FIG. 6 illustrates a film 600 held in a hand 602. The film 600, prior to being applied to a device, is flexible or malleable. The film 600 (as well as other films discussed herein), for example, may have elongation properties of greater than 400 % and tensile strengths on the order of 9200-9600 psi. Embodiments of the invention are not limited to these properties, however, and include films with different properties or with different ranges of the same properties. In addition to elongation and tensile strength, the hardness of the film can vary as described previously. Also, the tensile strength and elongation of the film 600 may depend on the thickness of the film 600.

Figure 7:
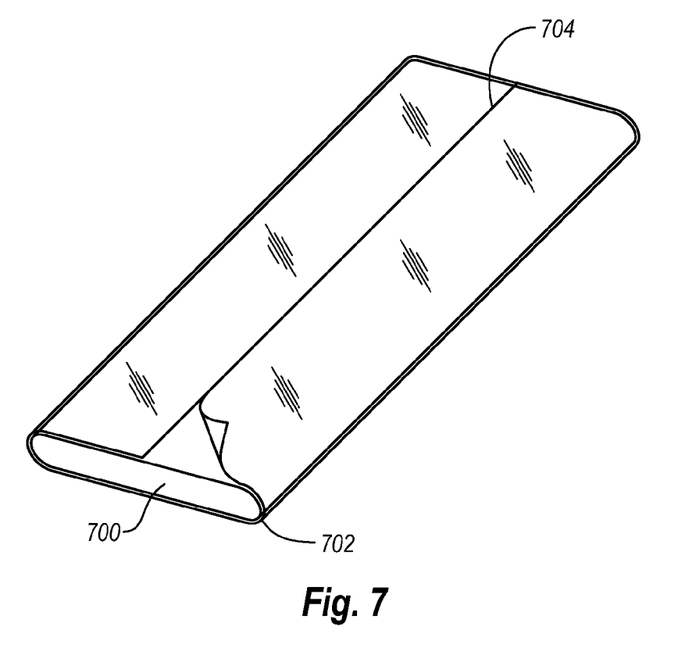
FIG. 7 illustrates a body cover for a device.

FIG. 7 illustrates another embodiment of a body cover. This example illustrates the flexibility of the film in accordance with embodiments of the invention. In this example, a single film 702 is applied to the device 700. The device 700 has a body with a shape that includes rounded sides as well as a display. The film 702 wraps completely around the device as a single film. The line 704 identifies where the two ends of the film meet, preferably on the back of the device 700. Further, the ends of the film 702 may be cut to provide clear visibility to any icon or marking on the device 700.

In this example, the body cover includes at least one film that wraps around a device and that adapt to the shape of the surface being covered. Thus, the flexibility of the film enables the film to wrap around the device to provide protection to all or most surfaces of the device. If desired, the ends of the device 700 may not be covered by the film 702 or may be covered by separate films. The surface of the device 700 may include a screen as well as other portions of the front surface, the back surface, the sides, and the like or any combination thereof. The film 702 can lay flat against contours of the body surface without bunching. The film 702 is substantially transparent etc. The film can optionally include a cutout area to account for user interface, ports, and the like. The film 702 is a body wrap that covers substantially all of the device's surfaces. In this example, however, the ends of the device are not covered. However, the film 702 have taps that fold down over the ends, while accounting for ports etc.

Figure 8:
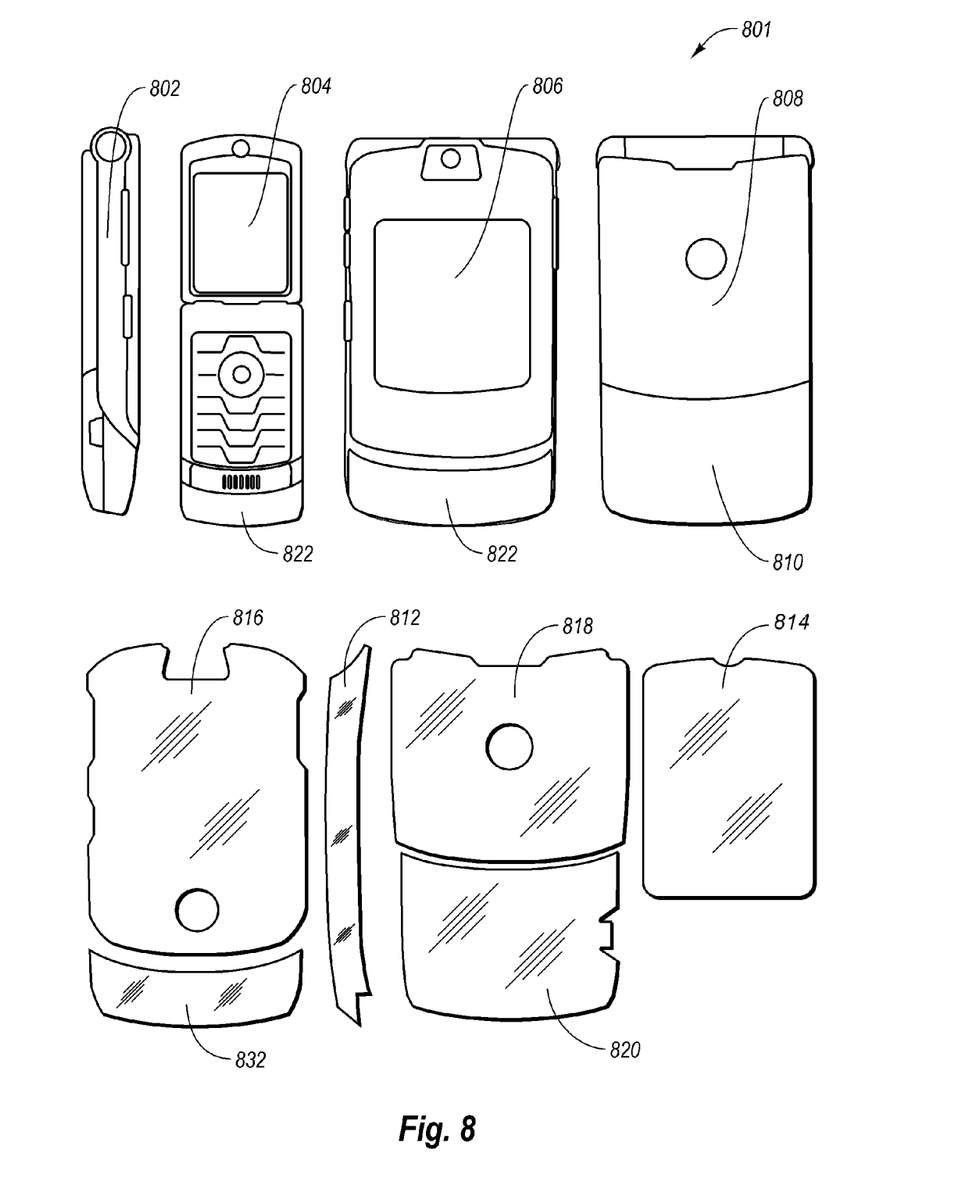
FIG. 8 illustrates another embodiment of a body cover for an electronic device.

In another embodiment, the display of the device may be slightly inset. In this instance, a single film can be used to cover the display as well as additional surfaces of the device. The film typically includes a strong adhesive that ensures that the film does not peel away from the screen. Advantageously, the film also prevents dirt or grime from accumulating at the edges of the screen or display FIG. 8 illustrates another embodiment of a body cover for a device such as a cellular telephone. In this example, the body cover includes multiple films. The various films are formed or cut specifically for various surfaces of the device. For example, the film 812 is applied to the surface 802. The film 816 is applied to the surface 806. The film 832 is applied to the surface 822. The film 818 is applied to the surface 808. The film 820 is applied to the surface 810. The film 814 is applied to the display 804.

As illustrated in FIG. 8, the films 812, 814, 818, 820, 816, and 832 are selected such that they protect the surfaces of the device without interfering with the operation of the device. The device 801 is a clamshell device, includes a battery cover, and has other features. The films are selected to ensure that the battery can be changed without having to be removed.

The films may also include cutout areas to account for surfaces of the device that may not be ideal for adhesion. For instance, the device 801 may include a marking that has ridges, an uneven surface, and the like. A corresponding cutout area may be formed in the corresponding film to ensure good adhesion of the film to the respective surfaces. The markings on the device may therefore not be covered by a film.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A body cover for an electronic device, the covering comprising:
   a first film configured to cover a first surface of an electronic device, the first surface having a screen disposed therein, wherein the first film lays flat against the first surface;
   a second film, physically separate from the first film, configured to cover a second surface of the electronic device such that the second film lays flat against the second surface, wherein the second film includes edges that wrap around and cover portions of one or more sides of the electronic device, the one or more sides connecting the first surface of the device with the second surface; and
   one or more cuts formed in the second film to accommodate a corner of the electronic device, the one or more cuts formed such that the second film lays flat against the second surface as the second film approaches the corner of the electronic device;
   wherein the first film and the second film do not overlap each other.

2. The protective covering of claim 1, the first film comprising one or more cutout areas, at least one cutout area sized to accommodate a user interface of the electronic device.

3. The protective covering of claim 1, the edges of the second film including cuts such that one or more ports of the device remain accessible to a user.

4. The protective covering of claim 1, wherein both the first film and the second film further comprise an adhesive that adheres the first film and the second film to the device.

5. The protective covering of claim 1, wherein the one or more cuts are configured to adapt to at least one of:
   edges of the device;
   sloping surfaces;
   ridges;
   corners;
   rounded corners;
   discontinuities in a surface;
   ports on the device;
   bulges on a surface;
   depressions on a surface; or
   rounded surfaces.

6. The protective covering of claim 1, wherein the first and second film substantially cover all surfaces of the device including a display of the device.

7. The protective covering of claim 2, further comprising a third film specifically shaped for the user interface.

8. The protective covering of claim 1, the first film further comprising a cutout area to accommodate an inset screen.

9. The protective covering of claim 8, further comprising a third film shaped to substantially cover the inset screen.

10. The protective covering of claim 1, wherein the first surface is a front surface and the second surface is a back surface.

11. A body covering for a portable electronic device that has a first surface, a second surface, one or more sides connecting the first surface with the second surface, and one or more corners, the covering comprising:
   a first film configured to cover the first surface of the electronic device so that the first film lays flat against the first surface, wherein the first film is transparent throughout so as not to obscure the original look of the first surface; and a second film, physically separate from the first film, configured to cover the second surface of the electronic device so that the second film lays flat against the second surface,
  wherein the second film includes edges that are configured to wrap around and cover portions of one or more of the sides of the electronic device without overlapping with itself or with the first film; and
  one or more cuts formed in the second film to accommodate a corner of the electronic device, the one or more cuts formed such that the second film lays flat against the second surface as the second film approaches the corner.

12. A body covering for a portable electronic device that has a front surface, a back surface, and one or more sides connecting the front surface with the back surface, the covering comprising:
  a first film or first set of films configured to correspond to the shape and size of the front surface so that when applied to the device, the first film or first set of films lays flat against the front surface and covers substantially the entire front surface of the electronic device, the first film or first set of films being transparent throughout so as not to obscure the original look of the front surface of the electronic device; and
  a second film or second set of films, physically separate from the first film or first set of films, configured to correspond to the shape and size of the back surface and sides so that when applied to the device, the second film or second set of films lays flat against the back surface and sides and covers substantially the entire back surface and sides of the electronic device,
  wherein none of the films overlaps itself or any other film and wherein substantially the entire surface of the portable electronic device is covered by film.

13. The body covering as claimed in claim 12, wherein the electronic device has a port and wherein there are cutouts in a film that would otherwise cover the port so that when the film is applied to the device, the port is accessible.

14. The body covering as claimed in claim 12, wherein the electronic device has buttons and wherein there are cutouts in a film that would otherwise cover the buttons.

15. The body covering as claimed in claim 12, wherein the electronic device has a corner and wherein there are one or more cuts formed in a film to allow the film to substantially cover the corner of the electronic device such that the film lays flat against the corner.

16. The body covering as claimed in claim 12, wherein the electronic device has a surface that is not flat and wherein a film has one or more cuts formed therein such that the film lays flat against the non-flat surface.

17. The body covering as claimed in claim 12, wherein the film further comprises an adhesive that adheres the film to the device.

18. The body covering as claimed in claim 12, wherein the electronic device has a user interface and wherein there is a separate film that is shaped and sized to cover the user interface.

19. The body covering as claimed in claim 12, wherein the electronic device has a screen and wherein there is a separate film that is shaped and sized to cover the screen.

20. The body covering as claimed in claim 12, wherein a film configured to cover the back surface also includes edges that are configured to wrap around and cover portions of one or more of the sides of the electronic device.

21. A body covering for a portable electronic device that has a front surface, a back surface, and one or more sides connecting the front surface with the back surface, the covering comprising:
  a set of physically separate films configured to correspond to the shape and size of the front surface and back surface so that when applied to the device, the films lay flat against the front surface and back surface and cover substantially the entire front surface and back surface of the electronic device, wherein the portions of the films configured to cover the front surface are transparent throughout so as not to obscure the original look of the front surface of the electronic device, wherein no film overlaps with itself or any other film, and wherein substantially the entire surface of the portable electronic device is covered by film.

22. The body covering as claimed in claim 21, wherein the electronic device has a port and wherein there are cutouts in a film that would otherwise cover the port so that when the film is applied to the device, the port is accessible.

23. The body covering as claimed in claim 21, wherein the electronic device has buttons and wherein there are cutouts in a film that would otherwise cover the buttons.

24. A body covering for a portable electronic device that has a front surface, a back surface, and one or more sides connecting the front surface with the back surface, the covering comprising:
  a film or set of films configured to correspond to the shape and size of the front surface and back surface so that when applied to the device, the film or set of films lays flat against the front surface and back surface and covers substantially the entire front surface and back surface of the electronic device, wherein the portions of the film or set of films configured to cover the front surface are transparent throughout so as not to obscure the original look of the front surface of the electronic device, wherein no film overlaps with itself or any other film, and wherein substantially the entire surface of the portable electronic device is covered by film, wherein the electronic device has a corner and wherein there are one or more cuts formed in a film to allow the film to substantially cover the corner of the electronic device such that the film lays flat against the corner.

25. A body covering for a portable electronic device that has a front surface, a back surface, and one or more sides connecting the front surface with the back surface, the covering comprising:
  a film or set of films configured to correspond to the shape and size of the front surface and back surface so that when applied to the device, the film or set of films lays flat against the front surface and back surface and covers substantially the entire front surface and back surface of the electronic device, wherein the portions of the film or set of films configured to cover the front surface are transparent throughout so as not to obscure the original look of the front surface of the electronic device, wherein no film overlaps with itself or any other film, and wherein substantially the entire surface of the portable electronic device is covered by film, wherein the electronic device has a surface that is not flat and wherein a film has one or more cuts formed therein such that the film lays flat against the non-flat surface.

26. The body covering as claimed in claim 21, wherein the film further comprises an adhesive that adheres the film to the device.

27. The body covering as claimed in claim 21, wherein the electronic device has a user interface and wherein there is a separate film that is shaped and sized to cover the user interface.

28. The body covering as claimed in claim 21, wherein the electronic device has a screen and wherein there is a separate film that is shaped and sized to cover the screen.

29. The body covering as claimed in claim 21, wherein a film configured to cover the back surface also includes edges that are configured to wrap around and cover portions of one or more of the sides of the electronic device.

30. The protective covering of claim 1, wherein the electronic device has a corner and wherein there are one or more cuts formed in a film to allow the film to substantially cover the corner of the electronic device such that the film lays flat against the corner.

31. The body covering as claimed in claim 12, wherein the electronic device has a corner and one or more cuts are formed in a film to accommodate the corner, the one or more cuts formed such that the film lays flat against the surface of the electronic device as the film approaches the corner.

32. A body covering for a portable electronic device that has a front surface, a back surface, and one or more sides connecting the front surface with the back surface, the covering comprising:
a film or set of films configured to correspond to the shape and size of the front surface and back surface so that when applied to the device, the film or set of films lays flat against the front surface and back surface and covers substantially the entire front surface and back surface of the electronic device, wherein the portions of the film or set of films configured to cover the front surface are transparent throughout so as not to obscure the original look of the front surface of the electronic device, wherein no film overlaps with itself or any other film, and wherein substantially the entire surface of the portable electronic device is covered by film, wherein the electronic device has a corner and one or more cuts are formed in a film to accommodate the corner, the one or more cuts formed such that the film lays flat against the surface of the electronic device as the film approaches the corner.

33. The body covering as claimed in claim 12, wherein the first and second films or set of films are smooth as they lay flat against the surface of the device.

34. The body covering as claimed in claim 21, wherein the films are smooth as they lay flat against the surface of the device.

35. The body covering as claimed in claim 12, wherein both the first and second films or set of films are transparent throughout so as not to obscure the original look of the surfaces of the electronic device.

36. The body covering as claimed in claim 21, wherein the films are transparent throughout so as not to obscure the original look of the surfaces of the electronic device.

37. A body covering for a portable electronic device that has a first surface, a second surface, and one or more sides connecting the first surface with the second surface, and corners where the one or more sides meet the second surface, the covering comprising:
a first film configured to substantially cover the first surface of the portable electronic device, wherein the first film lays flat against the first surface and wherein the first film is transparent throughout so as not to obscure the original look of the first surface;
a second film, physically separate from the first film, configured to substantially cover the second surface of the electronic device such that the second film lays flat against the second surface, wherein the second film includes edges that wrap around and cover portions of one or more of the sides of the electronic device; and
one or more cuts formed in the second film to accommodate the corners of the electronic device, the one or more cuts formed such that the second film lays flat against the second surface as the second film approaches the corners of the electronic device and such that the second film covers both the second surface and portions of at least two of the one or more sides at each of the corners;
wherein the first film and the second film do not overlap each other.

\* \* \* \* \*

UNITED STATES PATENT AND TRADEMARK OFFICE
CERTIFICATE OF CORRECTION

Page 1 of 1

PATENT NO.       : 7,957,524 C1
APPLICATION NO.  : 95/000649
DATED            : September 4, 2013
INVENTOR(S)      : Phillip John Chipping It is certified that error appears in the above-identified patent and that said Letters Patent is hereby corrected as shown below:

Title Page:

Item (73), delete the Assignee information and substitute the following:

--ZAGG INTELLECTUAL PROPERTY HOLDING CO., INC., Salt Lake City, UT (US)--

Signed and Sealed this
Sixth Day of May, 2014

Michelle K. Lee
*Deputy Director of the United States Patent and Trademark Office*

(12) INTER PARTES REEXAMINATION CERTIFICATE (686th)

United States Patent
Chipping (10) Number: US 7,957,524 C1
(45) Certificate Issued: Sep. 4, 2013

(54) PROTECTIVE COVERING FOR AN ELECTRONIC DEVICE

(75) Inventor: Phillip Chipping, Salt Lake City, UT (US)

(73) Assignee: Cerberus Business Finance, LLC, New York, NY (US)

Reexamination Request:
No. 95/000,649, Feb. 2, 2012

Reexamination Certificate for:
Patent No.: 7,957,524
Issued: Jun. 7, 2011
Appl. No.: 11/681,665
Filed: Mar. 2, 2007

Related U.S. Application Data (60) Provisional application No. 60/778,339, filed on Mar. 2, 2006.

(51) Int. Cl.
*H04M 1/02* (2006.01)

(52) U.S. Cl.
USPC .................. 379/428.01; 379/437; 455/575.1; 206/320

(58) Field of Classification Search
None
See application file for complete search history.

(56) References Cited

To view the complete listing of prior art documents cited during the proceeding for Reexamination Control Number 95/000,649, please refer to the USPTO's public Patent Application Information Retrieval (PAIR) system under the Display References tab.

*Primary Examiner* — Joseph A. Kaufman (57) ABSTRACT

A protective cover for electronic devices. A device is examined and a film is prepared. The film may include multiple pieces and may have cutouts for discontinuities in the surfaces of the device or to accommodate a user interface. The corners or other portions of the films are then cut such that the films substantially cover the surface of the device without bunching or creating air pockets.

US 7,957,524 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-10, 30, 35 and 36 are cancelled.

Claims 11, 12, 21, 24, 25, 32 and 37 are determined to be patentable as amended.

Claims 13-20, 22, 23, 26-29, 31, 33 and 34, dependent on an amended claim, are determined to be patentable.

11. A body covering for a portable electronic device that has a first surface, a second surface, one or more sides connecting the first surface with the second surface, and one or more corners, the covering comprising:
 a first film configured to cover the first surface of the electronic device so that the first film lays flat against the first surface, wherein the first film is transparent throughout so as not to obscure the original look of the first surface; and
 a second film, physically separate from the first film, configured to cover the second surface of the electronic device so that the second film lays flat against the second surface,
  wherein the second film includes edges that are configured to wrap around and cover portions of one or more of the sides of the electronic device without overlapping with itself or with the first film;
  *wherein the second film is transparent throughout so as not to obscure the original look of the second surface;* and
  one or more cuts formed in the second film to accommodate a corner of the electronic device, the one or more cuts formed such that the second film lays flat against the second surface as the second film approaches the corner.

12. A body covering for a portable electronic device that has a front surface, a back surface, and one or more sides connecting the front surface with the back surface, the covering comprising:
 a first film or first set of films configured to correspond to the shape and size of the front surface so that when applied to the device, the first film or first set of films lays flat against the front surface and covers substantially the entire front surface of the electronic device, the first film or first set of films being transparent throughout so as not to obscure the original look of the front surface of the electronic device; and
 a second film or second set of films, physically separate from the first film or first set of films, configured to correspond to the shape and size of the back surface and sides so that when applied to the device, the second film or second set of films lays flat against the back surface and sides and covers substantially the entire back surface and sides of the electronic device, *the second film or second set of films being transparent throughout so as not to obscure the original look of the back surface of the electronic device;*
 wherein none of the films overlaps itself or any other film and wherein substantially the entire surface of the portable electronic device is covered by film.

21. A body covering for a portable electronic device that has a front surface, a back surface, and one or more sides connecting the front surface with the back surface, the covering comprising:
 a set of physically separate films configured to correspond to the shape and size of the front surface and back surface so that when applied to the device, the films lay flat against the front surface and back surface and cover substantially the entire front surface and back surface of the electronic device, wherein the [portions of the] films [configured to cover the front surface] are transparent throughout so as not to obscure the original look of [the front surface of] the electronic device, wherein no film overlaps with itself or any other film, and wherein substantially the entire surface of the portable electronic device is covered by film.

24. A body covering for a portable electronic device that has a front surface, a back surface, and one or more sides connecting the front surface with the back surface, the covering comprising:
 a film or set of films configured to correspond to the shape and size of the front surface and back surface so that when applied to the device, the film or set of films lays flat against the front surface and back surface and covers substantially the entire front surface and back surface of the electronic device, wherein the [portions of the] film or set of films [configured to cover the front surface] are transparent throughout so as not to obscure the original look of [the front surface of] the electronic device, wherein no film overlaps with itself or any other film, and wherein substantially the entire surface of the portable electronic device is covered by film, wherein the electronic device has a corner and wherein there are one or more cuts formed in a film to allow the film to substantially cover the corner of the electronic device such that the film lays flat against the corner.

25. A body covering for a portable electronic device that has a front surface, a back surface, and one or more sides connecting the front surface with the back surface, the covering comprising:
 a film or set of films configured to correspond to the shape and size of the front surface and back surface so that when applied to the device, the film or set of films lays flat against the front surface and back surface and covers substantially the entire front surface and back surface of the electronic device, wherein [the portions of] the film or set of films [configured to cover the front surface] are transparent throughout so as not to obscure the original look of [the front surface of] the electronic device, wherein no film overlaps with itself or any other film, and wherein substantially the entire surface of the portable electronic device is covered by film, wherein the electronic device has a surface that is not flat and wherein a film has one or more cuts formed therein such that the film lays flat against the non-flat surface.

32. A body covering for a portable electronic device that has a front surface, a back surface, and one or more sides connecting the front surface with the back surface, the covering comprising:
 a film or set of films configured to correspond to the shape and size of the front surface and back surface so that when applied to the device, the film or set of films lays flat against the front surface and back surface and covers substantially the entire front surface and back surface of the electronic device, wherein [the portions of] the film or set of films [configured to cover the front surface] are transparent throughout so as not to obscure the original look of [the front surface of] the electronic device, wherein no film overlaps with itself or any other film, and wherein substantially the entire surface of the portable electronic device is covered by film, wherein the electronic device has a corner and one or more cuts are formed in a film to accommodate the corner, the one or more cuts formed such that the film lays flat against the surface of the electronic device as the film approaches the corner.

37. A body covering for a portable electronic device that has a first surface, a second surface, and one or more sides connecting the first surface with the second surface, and corners where the one or more sides meet the second surface, the covering comprising:
- a first film configured to substantially cover the first surface of the portable electronic device, wherein the first film lays flat against the first surface and wherein the first film is transparent throughout so as not to obscure the original look of the first surface;
- a second film, physically separate from the first film, configured to substantially cover the second surface of the electronic device such that the second film lays flat against the second surface, wherein the second film includes edges that wrap around and cover portions of one or more of the sides of the electronic device, *and wherein the second film is transparent throughout so as not to obscure the original look of the second surface*; and
- one or more cuts formed in the second film to accommodate the corners of the electronic device, the one or more cuts formed such that the second film lays flat against the second surface as the second film approaches the corners of the electronic device and such that the second film covers both the second surface and portions of at least two of the one or more sides at each of the corners;
- wherein the first film and the second film do not overlap each other.

\* \* \* \* \*